J. A. COOPER.
RIM AND TIRE FOR VEHICLE WHEELS.
APPLICATION FILED FEB. 9, 1911.
1,053,141.
Patented Feb. 11, 1913.
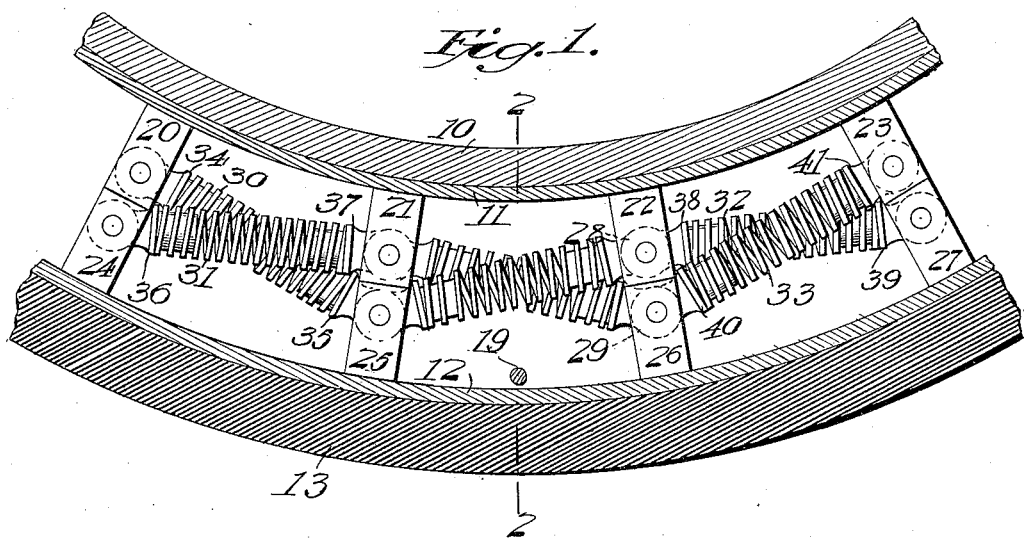
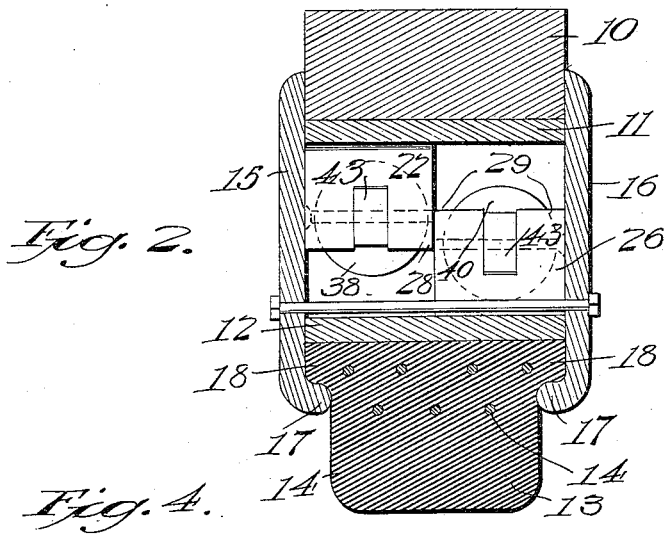
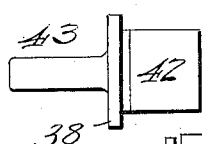
WITNESSES
INVENTOR
James A. Cooper
by Geo. S. Gaston
his Attorney

UNITED STATES PATENT OFFICE.

JAMES A. COOPER, OF CHATTANOOGA, TENNESSEE, ASSIGNOR OF ONE-HALF TO D. W. HUGHES, OF CHATTANOOGA, TENNESSEE.

RIM AND TIRE FOR VEHICLE-WHEELS.

1,053,141. Specification of Letters Patent. Patented Feb. 11, 1913.

Application filed February 9, 1911. Serial No. 607,684.

*To all whom it may concern:*

Be it known that I, JAMES A. COOPER, a citizen of the United States, residing at Chattanooga, in the county of Hamilton and State of Tennessee, have invented new and useful Improvements in Rims and Tires for Vehicle-Wheels, of which the following is a specification.

This invention relates to rims and tires for vehicle wheels designed as substitutes for pneumatic tires.

The advantages for pneumatic tires are well known, but it is questionable whether these advantages are not overcome by their disadvantages. The original cost of such tires is heavy and the expense of replacing pneumatic tires, or repairing them, is almost prohibitive for ordinary purposes, so that the use of motor vehicles is thereby very much limited. Besides this matter of expense, the puncture or collapse of such tires at most inopportune times and places, causes vexation, delays and disappointments, and necessitates irksome precautions such as carrying repairing tools and materials and extra tires. For these reasons many journeys are abandoned, or made over circuitous routes, to avoid roads, however direct, which are rough or rocky, thus occasioning much loss of time and money.

The object of this invention is to provide a rim for vehicle wheels as a substitute for such pneumatic tired wheels, which will, by reason of the absence of all liability of puncture and collapse, and the presence of all the resiliency necessary to absorb the varying strains due to driving, braking and turning, overcome all of the disadvantages of the pneumatic tires.

With this object in view, the invention consists in the improved combined rim and tire for vehicle wheels which will be hereinafter fully described, the particular points of novelty of which, will be specifically pointed out in the appended claim.

In order that my invention may be readily understood, I will now proceed to fully describe its construction and operation in connection with the accompanying drawing, in which:—

Figure 1, represents, in side elevation, a portion of the rim and tire of a wheel, constructed in accordance with my invention, the near side flange being removed. Fig. 2, represents a transverse sectional view of the same on the plane indicated by the broken line 2—2 of Fig. 1. Figs. 3 and 4, represent views in elevation of the lugs to be secured to the ends of the springs, and Fig. 5, represents a view in elevation of a modified arrangement of the springs.

Like reference characters indicate the same parts in all of the figures of the drawing.

Referring specifically to the drawing, 10 indicates the usual felly, 11 an inner metallic rim around the felly, 12 the outer rim around at a distance from the inner rim 11, and 13 an ordinary solid rubber tire around the outer rim and strengthened by steel wire 14, molded into it.

On each side of the felly and the outer and inner rims, is an annular inclosing and clamping plate, as at 15, 16, which, with the two rims, form an annular chamber rectangular in outline on radial planes in which all of the working parts hereinafter to be described are inclosed and protected from dirt, water, mud, etc. At the outer edge of each side plate is an inwardly turned edge, as at 17, to engage over a pair of outwardly projecting flanges 18, of the tire B, to assist in holding the tire in position on the outer rim. The side plates are secured in place by bolts 19, passing through them near the outer rim 12.

At suitable distances apart, forked lugs 20, 21, 22, 23, Fig. 1, are secured to the outside of the inner rim, and radially in line with such lugs, forked lugs 24, 25, 26, 27, are secured to the inside of the outer rim, the inner portion of each of the lugs 20 to 23, and the outer portion of the lugs 24 to 27, being forked as at 28 and 29, respectively. There are as many pairs of these lugs 20 to 27, as may be necessary, the number varying as the need of greater or less resiliency is required, as will be readily understood by the description to follow herein. Lugs 22 and 26 being to the right of the section line 2—2 of Fig. 1, they are illustrated in Fig. 2, and inasmuch as all of the lugs 20 to 27 are of the same shape, the separate illustration of the lugs 22 and 26 in Fig. 2 will be sufficient for an illustration of all.

It will be observed that each of the lugs comprise a main body and forked ends, the forked ends 28, of the lugs 20 to 23, projecting outward, and the forked ends 29 of lugs 24 to 27, inward, all of the forked ends lying in planes parallel with the side plates 15 and 16, so that the spaces between the forked ends of each lug are also parallel with said plates.

In Fig. 3, there is illustrated a head or end piece for a purpose hereinafter explained. There are as many of these heads as there are lugs 20 to 27, and twice as many as there are springs hereinafter named, there being three pairs or complete sets of such springs illustrated in Fig. 1, marked respectively 30 and 31 to left, and 32 and 33 to the right. Each of the heads or end pieces shown at 34, 35, 36, 37, 38, 39, 40, 41, Fig. 1, is composed of a main body, as at 42, in Fig. 4, and a single central flange as at 43, the main body of each head being adapted to receive one end of one of the springs 30 to 33. Each of the central flanges 43, are adapted to engage between the forked ends of one lug of the inner rim or one lug of the outer rim, Fig. 2, showing the flange 43, of head 38, between the forked ends 28 of lug 22, of the inner rim, and the flange 43 of head 40 between the forked ends 29 of lug 26 of the outer rim. The lug 22, of the inner rim is in the same plane as the lug 27 of the outer rim and the head 39 supports and carries one end of the spring 32 whose other end is carried on head 38, the flange 43, of head 38 being pivotally secured by a pin or bolt 44, between the forks of lug 22, and the flange of head 39 by a pin or bolt 45, between the forks of lug 27. Each complete set, comprising a spring and two heads is pivotally connected to one lug of the inner rim and the adjacent lug of the outer ring and the stress of each spring is therefore in a line at an inclination to a tangential line drawn on either the inner or outer rim at a point on a radial line passing transversely through the mid-length of the spring. These springs are the only connections between the inner and outer rims and the tendency of each spring is to draw the outer rim inward and toward the lug of the inner rim to which the inner end of the spring is attached, and as will be seen by inspection of Fig. 1, and each spring being crossed by another, and connecting lugs at different radial points on the two rims, the two rims will be held normally yieldingly at regular distances apart with a spring to resist and cushion every strain which can be put upon the wheel. All of the lugs are rectangular in outline on radial planes and each lug of the inner rim overlaps the lug of the outer rim in radial alinement with it, as seen in Fig. 2, in which the lug 22 of the inner rim is shown overlapping the lug 26, of the outer rim, these lugs snugly fitting the space between the side plates 15 and 16 and being so placed and secured in position that their free sliding movement upon, or with relation to each other, will not be impeded. The bolts 19 being near the outer rim, they will cause the side plates 15 and 16 to tightly clamp the outer rim but it will not cause said plates to clamp the felly and inner rim so tightly as to prevent their free sliding between said plates when necessary.

It will be observed, that the felly 10, is of the usual and ordinary construction, and that the inner rim 11 takes the place of the usual metal tire and it will be at once obvious that my complete construction as hereinbefore described, can be applied to any of the ordinary wheels now in use by merely removing the ordinary metal tire and securing my structure on the felly in place thereof.

In Fig. 5, I have illustrated a modified form of springs and end pieces or lugs, a reinforcing spring 45 being inserted inside of the spring 46, the latter being of the same construction as those before described.

While I have specifically described the construction of each part comprised in the herein illustrated embodiment, I desire to emphasize the face that slight changes and variations may be made in such constructions without departing from the spirit and scope of the invention.

Having thus fully described my invention, what I claim as new and desire to secure by Letters Patent of the United States, is:—

A resilient wheel comprising an inner rim, an outer rim, an elastic tire, a felly, annular side plates and bolts passed through said plates near the outer rim clamping them together and inclosing a space between the two rims and said side plates, the inner rim being slidable between the plates, a series of lugs rectangular in outline in radial planes secured to the inner rim, projecting radially into said rectangular space and slidable therein, a similar series of the same number of lugs projecting radially from the outer rim into said rectangular space, the individual lugs of each of the two series overlapping those of the other series and being in the same radial plane therewith, and springs connecting each lug of each series with the next adjacent lugs of the other series in both directions, the overlapping pairs of lugs snugly fitting the rectangular space and being slidable with relation to each other.

In testimony whereof, I affix my signature in presence of two witnesses.

JAMES A. COOPER.

Witnesses:
 OLIVER P. MORGAN,
 R. B. GRAFTON.